(12) United States Patent
Ma et al.

(10) Patent No.: US 10,805,507 B2
(45) Date of Patent: Oct. 13, 2020

(54) METHOD AND SYSTEM FOR CONFIGURING CAMERAS TO CAPTURE IMAGES

(71) Applicant: Shanghai Xiaoyi Technology Co., Ltd., Shanghai (CN)

(72) Inventors: Tao Ma, Bellevue, WA (US); Chao He, Beijing (CN); Baoqi Wang, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 181 days.

(21) Appl. No.: 15/385,940

(22) Filed: Dec. 21, 2016

(65) Prior Publication Data
US 2018/0176425 A1    Jun. 21, 2018

(51) Int. Cl.
*H04N 5/06*     (2006.01)
*H04N 5/247*    (2006.01)

(52) U.S. Cl.
CPC .............. *H04N 5/06* (2013.01); *H04N 5/247* (2013.01)

(58) Field of Classification Search
CPC ................................ H04N 5/06; H04N 5/247
USPC ........................................................ 348/159
See application file for complete search history.

(56) References Cited

U.S. PATENT DOCUMENTS

| 2008/0143875 | A1* | 6/2008 | Scott ...................... H04N 5/222 348/512 |
| 2008/0211915 | A1* | 9/2008 | McCubbrey ..... G08B 13/19608 348/159 |
| 2016/0261807 | A1* | 9/2016 | Seshadrinathan .... H04N 5/2258 |
| 2016/0373640 | A1* | 12/2016 | van Hoff ............ G06Q 30/0269 |

* cited by examiner

*Primary Examiner* — Christopher G Findley
(74) *Attorney, Agent, or Firm* — Cantor Colburn LLP

(57) ABSTRACT

Methods and systems for configuring a plurality of cameras to start capturing images are disclosed. A method of configuring a plurality of cameras to capture images includes synchronizing clocks of a plurality of cameras to run on a same time and instructing the cameras to start capturing images at a capturing time. The method configures a plurality of cameras to start capturing images at the same time.

21 Claims, 9 Drawing Sheets

METHOD AND SYSTEM FOR CONFIGURING CAMERAS TO CAPTURE IMAGES

TECHNICAL FIELD

The present disclosure generally relates to methods and systems for configuring cameras to capture images, and more specifically to methods and systems for synchronizing cameras and configuring the cameras to start capturing images at a capturing time.

BACKGROUND

A multi-camera system can be more difficult to control than a single camera when images are to be captured. A system including more than one camera may produce unsynchronized contents captured by the cameras. For example, two or more cameras set up to record videos can produce unsynchronized videos among the cameras due to factors such as WiFi connection delay and/or program context switch delay among the connection threads. The higher the number of cameras in a multi-camera system, the greater the time difference there may be between the time the first camera in the system starts to record images and the time the last camera starts to record. In addition, clocks of the cameras may not run on the same time when the cameras are shipped from the factory, thus contributing to the difficulty of producing synchronized contents from the cameras. As a result, the videos recorded by prior art cameras may at times be out of synchronization, thus requiring post-recording adjustment of the recorded contents.

The disclosed methods and systems address one or more of the problems described above.

SUMMARY

According to a disclosed embodiment, there is provided a system for capturing images. The system can include a plurality of cameras for capturing images and a time-setting device having a first clock. The time-setting device can be configured to synchronize the cameras with the first clock by sending a current time value to the cameras and send a capturing time value to the cameras to start capturing images at a capturing time. The cameras can be configured to start capturing images at the capturing time.

According to another disclosed embodiment, there is provided a time-setting device for configuring a plurality of cameras to capture images. The time-setting device can include a clock configured to run on a time, a memory storing instructions, and a processor. The processor can be configured to execute the instructions to communicate with a first camera and a second camera; obtain a first current time value from the clock and instruct the first camera to set a first camera time to the first current time value, obtain a second current time value from the clock and instruct the second camera to set a second camera time to the second current time value, obtain a value of a capturing time based on a third current time value obtained from the clock, and instruct the first and second cameras to start capturing images at the capturing time.

According to yet another disclosed embodiment, there is provided a system for capturing images. The system can include a first camera having a first processor, a first clock, and a first capturing module, and a second camera having a second processor, a second clock, and a second capturing module. The first processor can be configured to receive a first current time value from a third clock, set the first clock to the first current time value to synchronize the first clock with the third clock, receive a value of a capturing time obtained based on the third clock, and instruct the first capturing module to start capturing images at the capturing time. The second processor can be configured to receive a second current time value obtained from the third clock, set the second clock to the second current time value to synchronize the second clock with the third clock, receive the value of the capturing time obtained based on the third clock, and instruct the second capturing module to start capturing images at the capturing time.

According to yet another disclosed embodiment, there is provided a method of configuring a plurality of cameras to capture images. The method can include synchronizing clocks of a plurality of cameras to run on a same time and instructing the cameras to start capturing images at a capturing time.

According to yet another disclosed embodiment, there is provided a method of causing a plurality of cameras to capture images. The method can include providing a plurality of cameras, configuring each of the cameras to run on a same time, providing a capturing time for the cameras, and configuring the cameras to start capturing images at the capturing time.

According to yet another disclosed embodiment, there is provided a method of configuring a plurality of cameras to start capturing images. The method can include establishing a connection with a first camera and a second camera, obtaining a first current time value based on a first clock and instructing the first camera to set time to the first current time value, obtaining a second current time value based on the first clock and instructing the second camera to set time to the second current time value, and obtaining a value of a capturing time based on the first clock and instructing the first and second cameras to start capturing images at the capturing time.

According to yet another disclosed embodiment, there is provided a method of configuring a plurality of cameras. The method can include connecting to a first camera and a second camera, the first camera including a first clock and the second camera including a second clock, instructing the first camera to set the first clock to a first current time value obtained from a local clock, instructing the second camera to set the second clock to a second current time value obtained from the local clock, and instructing the first and second cameras to start capturing images at a capturing time based on a third current time value obtained from the local clock.

According to yet another disclosed embodiment, there is provided a method of configuring a plurality of cameras. The method can include connecting to a first camera and a second camera, the first camera including a first clock and the second camera including a second clock, instructing the first camera to set the first clock to a first current time value obtained from a local clock, instructing the second camera to set the second clock to a second current time value obtained from the local clock, instructing the first camera to start capturing images at a first capturing time based on the local clock, and instructing the second camera to start capturing images at a second capturing time based on the local clock. The first capturing time can indicate a different time from the second capturing time.

According to yet another disclosed embodiment, there is provided a method of configuring multiple groups of cameras. The method can include assigning a first group of cameras and a second group of cameras, synchronizing the first group of cameras to a clock external to the first and second groups of cameras, instructing the first group of cameras to start capturing images at a first capturing time, synchronizing the second group of cameras to the clock, and instructing the second group of cameras to start capturing images at a second capturing time. The second capturing time can be later than the first capturing time.

According to yet another disclosed embodiment, there is provided a non-transitory computer readable medium with instructions stored thereon, that when executed by a processor, perform steps including synchronizing clocks of a plurality of cameras to run on a same time and instructing the cameras to start capturing images at a capturing time.

It is to be understood that both the foregoing general description and the following detailed description are exemplary and explanatory only and are not restrictive of the invention, as claimed.

BRIEF DESCRIPTION OF THE DRAWINGS

Methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
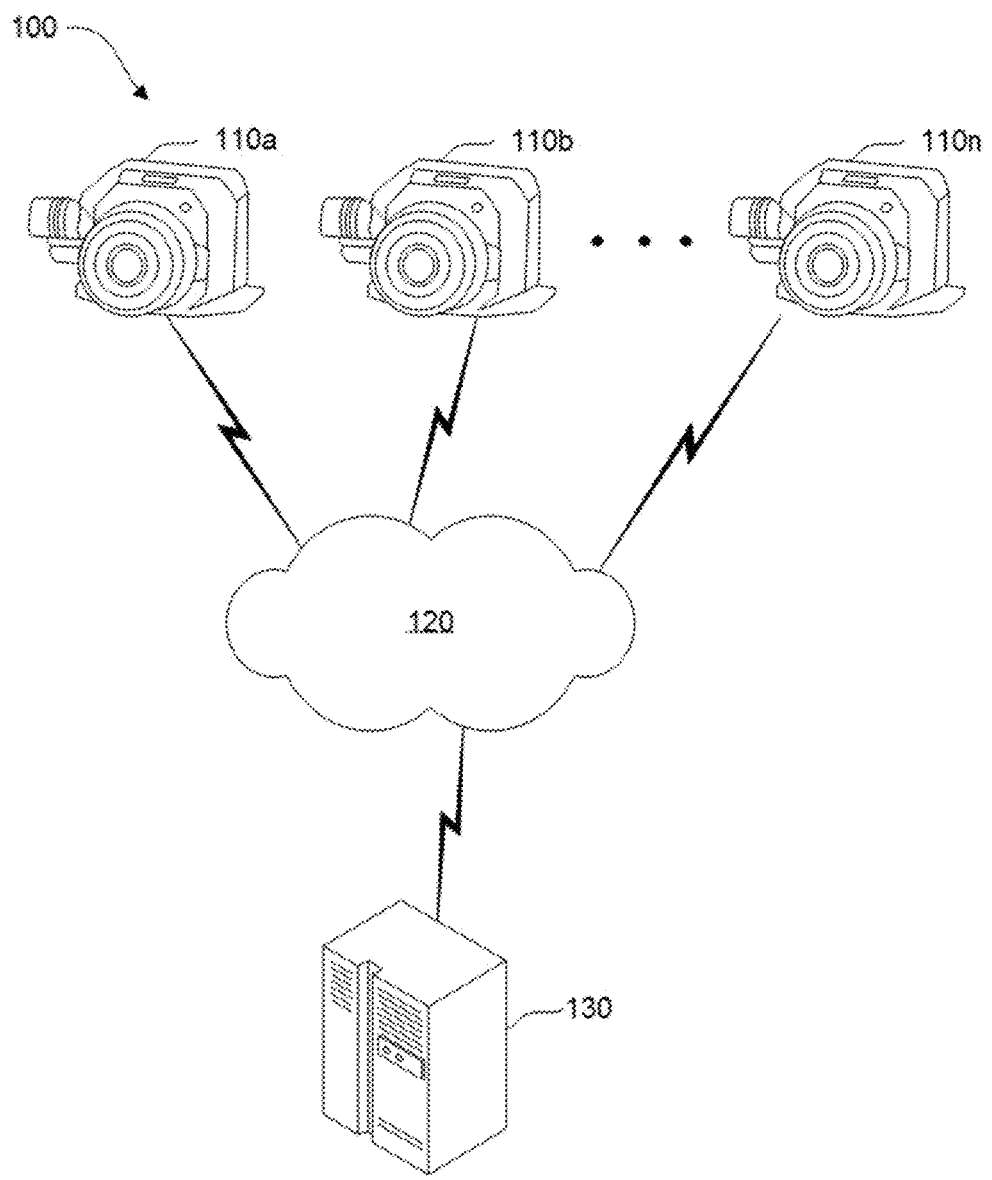
FIG. 1 is a schematic diagram illustrating a system for capturing images, consistent with an embodiment of the invention.

A system is disclosed which includes a plurality of cameras and a time-setting device connected to the cameras. As shown in FIG. 1, a system 100 can include a plurality of cameras including camera 110a, camera 110b, . . . , and camera 110n, where 110n refers to the Nth camera in the system, N being an integer greater than two. For the convenience of illustration, cameras 110a and 110b, among the plurality of cameras, will be described in more detail below when multiple cameras are described. However, it is understood that the description of cameras 110a and/or 110b may apply equally, when appropriate, to embodiments in which more than two cameras, such as n cameras, are provided. For example, relevant disclosure herein with respect to cameras 110a and/or 110b can be applicable to camera 110n unless the text clearly dictates otherwise.

Camera 110a and camera 110b can be connected to a time-setting device 130 via a connection 120. Connection 120 can include any of a direct connection, an indirect connection, a wired connection, a wireless connection, a network, or a combination thereof. For example, camera 110a and camera 110b are each connected to a wireless network to which time-setting device 130 is connected. In some embodiments, when camera 110a and camera 110b are connected to time-setting device 130, communications may be established between first camera 110a, second camera 110b, and time-setting device 130, as will be explained below.

Figure 2:
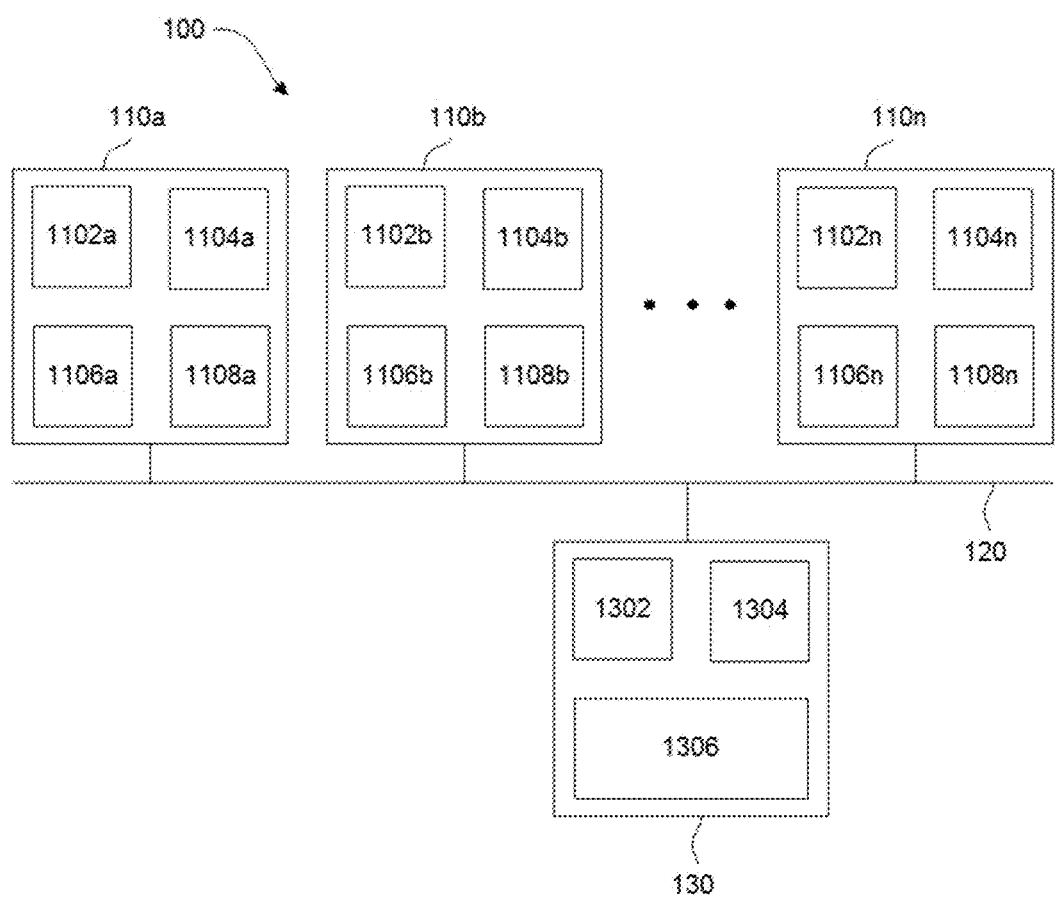
FIG. 2 is a block diagram illustrating the system of FIG. 1, consistent with an embodiment of the invention.

In some embodiments, system 100 may be represented in a block diagram as illustrated by FIG. 2. As shown in FIG. 2, camera 110a can be configured to include a processor 1102a, a clock 1104a, a communication module 1106a, and a capturing module 1108a, and camera 110b can be configured to include a processor 1102b, a clock 1104b, a communication module 1106b, and a capturing module 1108b. Similarly, camera 110n can be configured to include a processor 1102n, a clock 1104n, a communication module 1106n, and a capturing module 1108n. FIG. 2 also shows that time-setting device 130 can be configured to include a processor 1302, a clock 1304, and a communication module 1306.

In some embodiments, capturing module 1108a/1108b/1108n includes a lens and associated mechanical and/or electrical components for the capturing module to capture images. Capturing module 1108a/1108b/1108n may be configured to be controlled by processor 1102a/1102b/1102n to capture images.

In some embodiments, more than one of the processor, clock, or communication module in camera 110a/110b/110n can be integrated into a single component. For example, processor 1102a/1102b/1102n may include clock 1104a/1104b/1104n and/or communication module 1106a/1106b/1106n, respectively. Similarly, more than one of the processor, clock, and communication module in time-setting device 130 can be integrated into a single component. For example, processor 1302 may include clock 1304 and/or 1306.

In some embodiments, time-setting device 130 is capable of communicating with each of the cameras in system 100. For example, time-setting device 130 may be configured to transmit a signal to camera 110a, and camera 110a may be configured to transmit a signal to time-setting device 130. A signal described herein may represent an instruction, a command, a request, a response, a reply, a message, data, a parameter, a payload, or any combination thereof. It is understood that the different representations of a signal may only be for illustration purpose and not restrict the scope herein. For example, an instruction described for one situation may be a called a request or message in another situation.

As used herein, the terms "time," "system time," "current time," "capturing time," and "starting time" may refer to properties associated with a clock or device. "Time" or "system time" may refer to a continuously-changing quantity measured by a clock or device and running at a specific rate, and "current time" may refer to a fixed-valued quantity with respect to a specific moment as measured by the clock or device. "Capturing time" or "starting time" may be defined for the clock or device as a fixed-valued quantity with respect to a specific moment at which an image-capturing operation starts. Thus, different clocks or devices may run on different times, i.e., they operate asynchronously. Clocks or devices that are asynchronous may indicate different current times for a same specific moment. A capturing time can be configured for a particular device. In addition, "time" as discussed herein can be measured in seconds, tenths of a second, or milliseconds, for example.

In some embodiments, camera 110a can be configured to operate according to a time Ta. Specifically, clock 1104a of camera 110a can be configured to run on time Ta, which can be associated with camera 110a and/or an operation of camera 110a. Time Ta can be configured to a time by which camera 110a is subsequently operated after the configuration. In some embodiments, values of time Ta can be configured to be associated with images captured by camera 110a. For example, time Ta can be configured to be associated with one or more photos or videos captured by camera 110a. Specifically, time Ta can indicate a time value associated with a photo when the photo is captured by camera 110a, and time Ta can indicate a time value associated with an image frame of a video when the image frame is captured by camera 110a.

In some embodiments, clock 1104a can be configured to be synchronized with, that is, run on the same time as, another clock, such as clock 1304 of time-setting device 130. Time Ta of clock 1104a can indicate a current time value of clock 1104a at a specific moment. Clock 1104a can be configured by a signal transmitted to camera 110a. In some situations, clock 1104a may not yet be configured and thus not yet be operating before a configuration of clock 1104a occurs. In other situations, clock 1104a may have been configured to a time, such as a time configured according to factory settings.

In some embodiments, camera 110b can be configured to operate according to a time Tb. Specifically, clock 1104b of camera 110b can be configured to run on time Tb, which can be associated with camera 110b and/or an operation of camera 110b. Time Tb can be configured to a time by which camera 110b is subsequently operated after the configuration. In some embodiments, values of time Tb can be configured to be associated with images captured by camera 110b. For example, time Tb can be configured to be associated with one or more photos or videos captured by camera 110b. Specifically, time Tb can indicate a time value associated with a photo when the photo is captured by camera 110b, and time Tb can indicate a time value associated with an image frame of a video when the image frame is captured by camera 110b.

In some embodiments, clock 1104b can be configured to be synchronized with another clock, such as clock 1304 of time-setting device 130. Time Tb of clock 1104b can indicate a current time value of clock 1104b at a specific moment. Clock 1104b can be configured by a signal transmitted to camera 110b. In some situations, clock 1104b may not yet be configured and thus not yet be operating before a configuration of clock 1104b occurs. In other situations, clock 1104b may have been configured to a time, such as a time configured according to factory settings.

In some embodiments, all or a portion of the cameras in system 100 can be configured to capture images. For example, all cameras in system 100, i.e., cameras 110a, 110b, . . . , 100n, can be configured to capture images. In some examples, cameras 110a and 110b can be configured to capture photos and/or videos.

In some embodiments, cameras in system 100 can be configured to start capturing images when an event is triggered. An event triggering a camera in system 100 to start capturing images can include an occurrence of a capturing time. For example, a capturing time can include a time value at which a configured camera starts capturing images. The capturing time may be defined to be later than a current time of the camera when the capturing time is defined. When the capturing time occurs, i.e., when a current time value of the camera matches a value of the capturing time, the camera can be triggered to start capturing images. In such example, the capturing time (capturing time value) can be considered as a content of a time-triggering event for the camera to start capturing images at the capturing time.

In some embodiments, an event triggering a camera in system 100 to start capturing images can include a non-time based event. For example, a camera in system 100 can be configured to start capturing images when a connection between the camera and time-setting-device 130, for example, is established, or reestablished when the connection has been established previously but is disconnected. In some examples, a camera in system 100 can be configured to start capturing images when the camera senses an input. A capturing module of the camera can be configured to monitor a scene to be captured until a certain content, such as a target object, appears in the scene. For example, the camera can be configured to start capturing, by starting to take a photo or record a video, a scene once it determines that a human face has appeared in the scene.

In some embodiments, an event triggering a camera in system 100 to start capturing images can include a combination of a time-based event and a non-time based event. For example, the camera can be configured to start capturing images at a predefined capturing time only if a predefined non-time based event also occurs.

In some embodiments, a non-time based event may include an event in which a determination or estimation is made to a status or mode of the camera when a capturing time occurs. The camera may determine whether it has enough memory (not shown) to store images to be captured once the capturing time occurs to trigger image-capturing. If it is determined or estimated that the memory is not enough to store the next image(s) when the capturing time occurs, the camera may be configured not to start capturing images when the capturing time occurs. Alternatively, the camera may still be configured to start capturing images at the capturing time even if it is determined that there is insufficient memory at the capturing time. This may be feasible if the camera has been configured to upload the captured images to an external storage, for example, when the memory of the camera becomes full or unable to store additional images.

In some embodiments, a camera in system 100 can be configured to start capturing images when the camera is instructed to start capturing images. An instruction to start capturing images can include an instruction transmitted from time-setting device 130, for example. An instruction to start capturing images may indicate or contain a capturing time at which the camera is to start capturing images. In some embodiments, a capturing module of a camera in system 100 can be configured to start capturing images when the camera receives an instruction to start capturing images. The capturing module may be controlled by a processor of the camera to capture images when the processor processes a received instruction to start capturing images.

Configuration of a camera in system 100 to start capturing images at a specific time value (for example, a capturing time) according to some embodiments will be described. Take camera 110a as an example. Camera 110a can be configured to start capturing images at a time value Tap, where Tap represents a capturing time defined for clock 1104a of camera 110a. Clock 1104a may be already running on a time when Tap is defined, and Tap of clock 1104a may indicate a moment in time that is later than a current time of clock 1104a when Tap is defined. In this sense, time Tap can be configured to indicate a specific time value that clock 1104a may reach after time Tap is defined. Namely, camera 110a can be configured to start capturing images when a time value of clock 1104a matches time value Tap, i.e., when time Tap "occurs."

In some embodiments, the capturing of images that starts at time Tap can be configured such that a captured image (or image frame) is associated with a value of time Tap. For example, a first image captured by camera 110a when camera 110a starts capturing images at time Tap can be associated with a value of time Tap. As a particular example, a first image captured by camera 110a when camera 110a starts capturing images at time Tap is timestamped with the value of time Tap.

In some embodiments, a duration of time may lapse before a first image is captured by camera 110a after time Tap occurs. The duration of time may be an unintentional delay, a predefined time duration, or a combination thereof. In some embodiments, an event may occur and be associated with an operation of camera 110a before a first image is captured by camera 110a after time Tap occurs. In some embodiments, an action may be performed by or for camera 110a before a first image is captured by camera 110a after time Tap occurs. In circumstances where a time lapse, an action, or an event may occur before a first image is captured by camera 110a after time Tap occurs, a first image captured by camera 110a after camera 110a starts capturing images at time Tap can be timestamped with time Tap.

Camera 110b will now be taken as an example to illustrate configuration of another camera in system 100 to start capturing images at a specific time value (for example, a capturing time) according to some embodiments. Camera 110b can be configured to start capturing images at a time value Tbp, where Tbp represents a capturing time defined for clock 1104b of camera 110b. Clock 1104b may be already running on a time when Tbp is defined, and Tbp of clock 1104b may indicate a moment in time that is later than a current time of clock 1104b when Tbp is defined. In this sense, time Tbp can be configured to indicate a specific time value that clock 1104b may reach after time Tbp is defined. Namely, camera 110b can be configured to start capturing images when a time value of clock 1104b matches time value Tbp, i.e., when time Tbp "occurs."

In some embodiments, the capturing of images that starts at time Tbp can be configured such that a captured image (or image frame) is associated with a value of time Tbp. For example, a first image captured by camera 110b when camera 110b starts capturing images at time Tbp can be associated with a value of time Tbp. As a particular example, a first image captured by camera 110b when camera 110b starts capturing images at time Tbp is timestamped with the value of time Tbp.

In some embodiments, a duration of time may lapse before a first image is captured by camera 110b after time Tbp occurs. The duration of time may be an unintentional delay, a predefined time duration, or a combination thereof. In some embodiments, an event may occur and be associated with an operation of camera 110b before a first image is captured by camera 110b after time Tbp occurs. In some embodiments, an action may be performed by or for camera 110b before a first image is captured by camera 110b after time Tbp occurs. In circumstances where a time lapse, an action, or an event may occur before a first image is captured by camera 110b after time Tbp occurs, a first image captured by camera 110b after camera 110b starts capturing images at time Tbp can be timestamped with time Tbp.

It is to be noted that, in some embodiments, it may not be necessary for the clock (1104a/1104b) of the camera (110a/110b) to be already running before the capturing time (Tap/Tbp) can be defined for the clock. The capturing time can be defined for the clock even if the clock is not yet running or the clock is not yet configured according to the disclosure herein. During actual implementation of these embodiments, however, it needs to be ensured that any configuration of a time of the clock after the capturing time is defined for the clock will allow the capturing time to occur. The camera can be configured to issue a notice or warning to the user, for example, when a configuration of the clock completed after the capturing time is defined will not allow a time of the clock progresses to match the capturing time. In some examples, a notice or warning can also be issued when the capturing time is defined before a time of the clock can be configured according to the disclosure, or when the clock is configured according to the disclosure such that it would not be possible for the capturing time thus defined to occur.

It is understood that, for the camera (110a/110b) to be configured to start capturing images at the capturing time (Tap/Tbp) in some embodiments, the camera can be configured to include any specific implementations relating to the start of the camera to capture images at the capturing time and/or the actual image-capturing operation starting at the capturing time. These specific implementations will depend on what a person of the skill in the art wishes to choose but nevertheless fall within the scope of the embodiments.

It is noted that, in some embodiments, it is ensured that a time of a given camera can be configured before that same camera starts capturing images at its capturing time. However, it may be unnecessary for all cameras to complete configuration to have a time running before any one of the cameras starts capturing images at its capturing time. For example, system 100 may contain two groups of cameras configured to start capturing images at capturing times respective to the groups, e.g., at two different capturing times (two different capturing time values). One of the groups of cameras may be configured to start capturing images at the group's capturing time, which is before configuration of all the clock times for the other group of cameras could start or complete.

It is also noted that, in some embodiments, it is ensured that the capturing time of a given camera can be configured before that same camera starts capturing images at its capturing time. However, it may be unnecessary for all cameras to complete configuration to have a capturing time before any one of the cameras starts capturing images at its capturing time. For example, system 100 may contain two groups of cameras configured to start capturing images at capturing times respective to the groups, e.g., at two different capturing times (two different capturing time values). One of the groups of cameras may be configured to start capturing images at the group's capturing time, which is before configuration of all the capturing times for the other group of cameras could start or complete.

As described above, not all cameras will need to start capturing images at the same time. As another example, time Tap of camera 110a may be configured to be different from time Tbp of camera 110b. In yet another example, system 100 may include cameras divided into more than two groups. Each group of cameras can be configured to have a capturing time of the group different from the other groups. Every camera in a group can be configured to have the same capturing time. Alternatively, cameras within a group may be configured to have different capturing times.

In some embodiments, cameras in system 100 may not yet be running on the same time before any of the cameras is configured to start capturing images at its capturing time, or before any of the cameras is configured to a time according to the disclosure. The cameras having different times can be configured to the same time according to the disclosure before, for example, the cameras are configured to start capturing images at their capturing times. For example, a time of camera 110a may be different from a time of camera 110b before any of camera 110a or 110b starts capturing images or before cameras 110a and 110b are configured to run on the same time.

Figure 3:
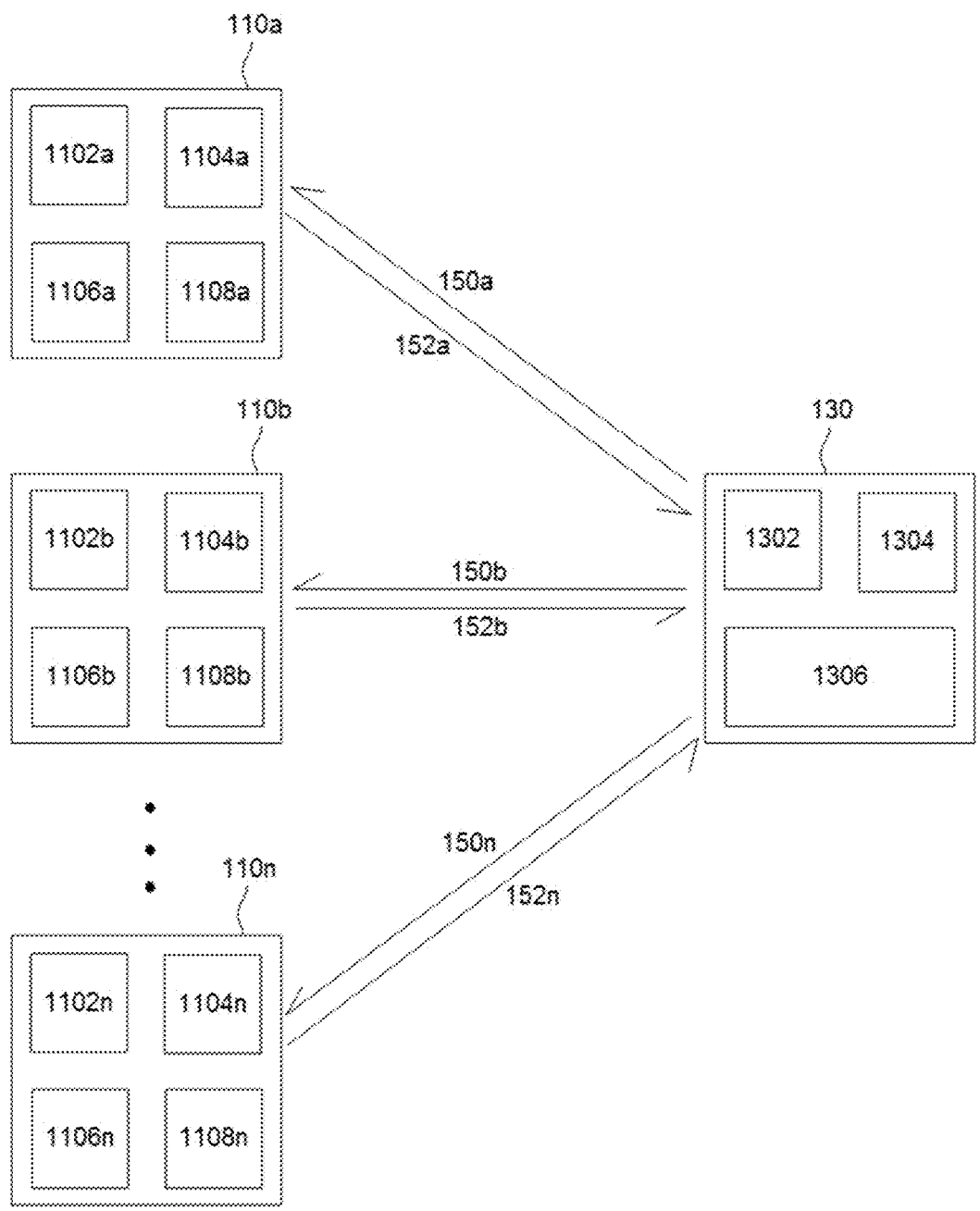
FIGS. 3 and 4 are diagrams representing interactions between a time-setting device and a plurality of cameras consistent with an embodiment of the invention.

With reference to FIGS. 2 and 3, the configuration of the cameras in system 100 to run on a certain time will be described in conjunction with time-setting device 130. In some embodiments, connection 120 can be established between camera 110a and time-setting device 130 over a network such a WiFi network. Time-setting device 130 can be configured to send an instruction 150a to camera 110a via connection 120 to set a time of camera 110a to a current time of time-setting device 130 once connection 120 between camera 110a and time-setting device 130 is established. Instruction 150a can indicate or contain the current time of time-setting device 130 when time-setting device 130 sends instruction 150a. Camera 110a can be configured to set the time of camera 110a to the current time sent with instruction 150a in response to receiving instruction 150a. As a result, camera 110a can be configured to subsequently run on the same time as time-setting device 130. Namely, camera 110a can be configured to be synchronized with time-setting device 130.

In some embodiments, camera 110a can be configured to send a notification 152a to time-setting device 130 to inform whether the time of camera 110a has been successfully configured according to instruction 150a. Time-setting device 130 can be configured to send another instruction to set the time of camera 110a to a current time of time-setting device 130 to camera 110a if notification 152a indicates that the time of camera 110a has not been successfully configured according to instruction 150a. Notification 152a may indicate or contain the current time sent with instruction 150a for verification at time-setting device 130.

Similarly, connection 120 can be established between camera 110b and time-setting device 130 over a network such a WiFi network. The network may be the same network for the connection between camera 110a and time-setting device 130. Time-setting device 130 can be configured to send an instruction 150b to camera 110b via connection 120 to set a time of camera 110a to a current time of time-setting device 130 once connection 120 between camera 110b and time-setting device 130 is established. Instruction 150b can indicate or contain the current time of time-setting device 130 when time-setting device 130 sends instruction 150b. Camera 110b can be configured to set a time of camera 110b to the current time sent with instruction 150b in response to receiving instruction 150b. As a result, camera 110b can be configured to subsequently run on the same time as time-setting device 130. Namely, camera 110b can be configured to be synchronized with time-setting device 130.

In some embodiments, camera 110b can be configured to send a notification 152b to time-setting device 130 to inform whether the time of camera 110b has been successfully configured according to instruction 150b. Time-setting device 130 can be configured to send another instruction to set the time of camera 110b to a current time of time-setting device 130 to camera 110b if notification 152b indicates that the time of camera 110b has not been successfully configured according to instruction 150b. Notification 152b may indicate or contain the current time sent with instruction 150b for verification at time-setting device 130.

The configuration of the times of cameras 110a and 110b using time-setting device 130 will be described in more detail referring to FIGS. 2 and 3. In some embodiments, processor 1302 of time-setting device 130 can be configured to obtain a current time value of clock 1304. Processor 1302 can be configured to send instruction 150a to camera 110a via communication module 1306 to set the time of camera 110a to the obtained current time value of clock 1304. Instruction 150a may indicate or contain the obtained current time value of clock 1302. Instruction 150a may also indicate a recipient of instruction 150a, which would be camera 110a in this case. Communication module 1306 can be configured to send instruction 150a via connection 120 to camera 110a. Communication module 1106a of camera 110a can be configured to receive instruction 150a and forward instruction 150a to processor 1102a of camera 110a. Processor 1102a can be configured to process instruction 150a and set clock 1104a to the current time value indicated by instruction 150a. Thus, clock 1104a of camera 110a can be configured to be synchronized with clock 1304 of time-setting device 130. Namely, clock 1104a can be configured to run on the same time as clock 1304.

In some embodiments, processor 1102a can be further configured to generate and send notification 152a, via communication module 1106a, to time-setting device 130 to inform whether clock 1104a has been successfully configured according to instruction 150a. Communication module 1106a can be configured to forward notification 152a to processor 1302 of time-setting device 130 after processor 1102a determines whether the configuration of clock 1104a according to instruction 150a has been successful. Processor 1302 can be configured to determine whether camera 110a has been successfully configured according to instruction 150a upon receiving notification 152a. Processor 1302 can be configured to obtain a current time value of clock 1304 and send another instruction to set time of camera 110a to this newly-obtained current time value of clock 1304 to camera 110a via communication module 1306 if processor 1302 determines that the configuration of clock 1104a according to instruction 150a has not been successful. In some situations, camera 110a can be configured to send a plurality of such notifications in response to the instructions to set time sent from time-setting device 130 until camera 110a has been successfully configured to be synchronized with time-setting device 130.

Similarly, processor 1302 of time-setting device 130 can be configured to obtain a current time value of clock 1304. Processor 1302 can be configured to send instruction 150b to camera 110b via communication module 1306 to set the time of camera 110b to the obtained current time value of clock 1304. Instruction 150b may indicate or contain the obtained current time value of clock 1302. Instruction 150b may also indicate a recipient of instruction 150b, which would be camera 110b in this case. Communication module 1306 can be configured to send instruction 150b via connection 120 to camera 110b. Communication module 1106b of camera 110b can be configured to receive instruction 150b and forward instruction 150b to processor 1102b of camera 110b. Processor 1102b can be configured to process instruction 150b and set clock 1104b to the current time value indicated by instruction 150b. Thus, clock 1104b of camera 110b can be configured to be synchronized with clock 1304 of time-setting device 130. Namely, clock 1104b can be configured to run on the same time as clock 1304.

In some embodiments, processor 1102b can be further configured to generate and send notification 152b, via communication module 1106b, to time-setting device 130 to inform whether clock 1104b has been successfully configured according to instruction 150b. Communication module 1106b can be configured to forward notification 152b to processor 1302 of time-setting device 130 after processor 1102b determines whether the configuration of clock 1104b according to instruction 150b has been successful. Processor 1302 can be configured to determine whether camera 110b has been successfully configured according to instruction 150b upon receiving notification 152b. Processor 1302 can be configured to obtain a current time value of clock 1304 and send another instruction to set time of camera 110b to this newly-obtained current time value of clock 1304 to camera 110b via communication module 1306 if processor 1302 determines that the configuration of clock 1104b according to instruction 150b has not been successful. In some situations, camera 110b can be configured to send a plurality of such notifications in response to the instructions to set time sent from time-setting device 130 until camera 110b has been successfully configured to be synchronized with time-setting device 130.

It is noted that the current time value sent to configure clock 1104a may be different from the current time value sent to configure clock 1104b. This may be because the current time value sent to clock 1104a is obtained at a different time run on clock 1304 from the current time value sent to clock 1104b. However, this may not be an issue for synchronization of clocks 1104a and 1104b because the current time values are both obtained from the same clock 1304.

In some embodiments, time-setting device 130 can be configured to set the clocks of the plurality of cameras in system 100 in a serial manner. Time-setting device 130 can be configured to send an instruction to set the time of each of a plurality of cameras to be configured. For example, time-setting device 130 can be configured to send instruction 150b to camera 110b after sending instruction 150a to camera 110a. In another example, time-setting device 130 can be configured to send instruction 150a to camera 110a, send instruction 150b to camera 110b, . . . , send instruction 150n to camera 110n in this order, where 150n refers to an instruction to set a time of camera 110n to a current time value obtained from clock 1304 when sending instruction 150n. To provide synchronization across the plurality of cameras to be configured, it is ensured that each instruction can be sent out to the corresponding camera after processor 1302 obtains a current time value at different time for each instruction. In this manner, every camera to be configured will be configured based on a different current time value of clock 1304. Based on these current time values from clock 1304, the cameras can be configured to run on the same time as clock 1304, i.e., the time of time-setting device 130. Namely, cameras 110a, 110b, . . . , 110n can be configured to be synchronized with time-setting device 130.

Figure 4:
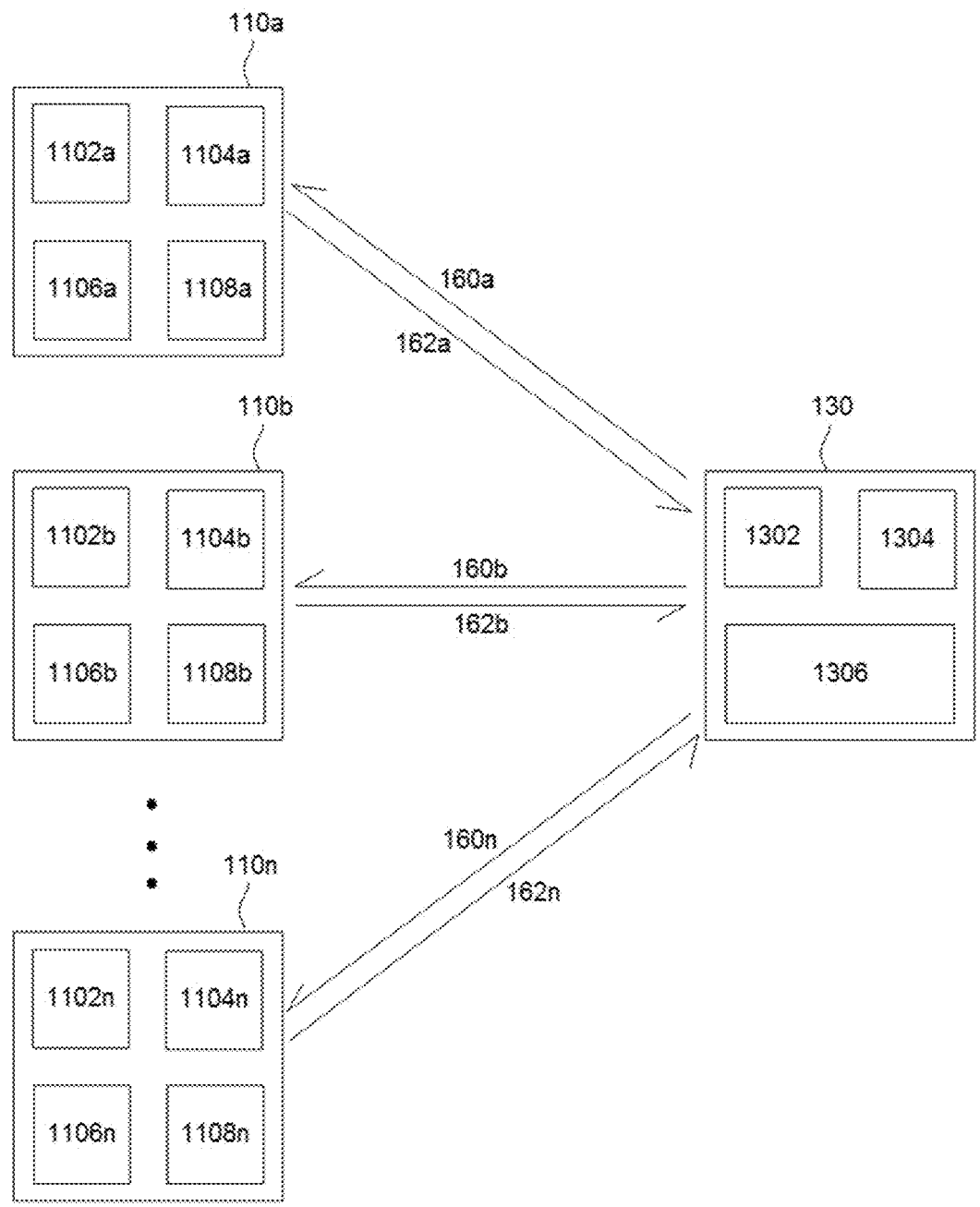

With reference to FIG. 4, the configuration of the cameras in system 100 to start capturing images at a capturing time will be described in conjunction with time-setting device 130. In some embodiments, time-setting device 130 can be configured to send an instruction 160a to camera 110a via connection 120 to start capturing images at time Tap. Time-setting device 130 can be configured to send instruction 160a after sending instruction 150a to camera 110a. Camera 110a can be configured to start capturing images at time Tap in response to receiving instruction 160a from time-setting device 130. Namely, camera 110a can be configured to start capturing images at time Tap as instructed by time-setting device 130. For example, camera 110a can start capturing images when time Ta progresses to or matches time Tap.

In some embodiments, camera 110a can be configured to send a notification 162a to time-setting device 130 to inform whether camera 110a has successfully started capturing images at time Tap. Time-setting device 130 can be configured to send another instruction to start capturing images if notification 162a indicates that camera 110a has not successfully started capturing images at time Tap.

Similarly, time-setting device 130 can be configured to send an instruction 160b to camera 110b via connection 120 to start capturing images at time Tbp. Time-setting device 130 can be configured to send instruction 160b after sending instruction 150b to camera 110b. Camera 110b can be configured to start capturing images at time Tbp in response to receiving instruction 160b from time-setting device 130. Namely, camera 110b can be configured to start capturing images at time Tbp as instructed by time-setting device 130. For example, camera 110b can start capturing images when time Tb progresses to or matches time Tbp.

In some embodiments, camera 110b can be configured to send a notification 162b to time-setting device 130 to inform whether camera 110b has successfully started capturing images at time Tbp. Time-setting device 130 can be configured to send another instruction to start capturing images if notification 162b indicates that camera 110b has not successfully started capturing images at time Tbp.

The configuration of cameras 110a and 110b in system 100 to start capturing images at the respective capturing times using time-setting device 130 will be described in more detail referring to FIG. 4. In some embodiments, processor 1302 of time-setting device 130 can be configured to define time Tap. As an example, time-setting device 130 can be configured to include an input device (not shown) such as a keypad or touchscreen configured to receive an input causing processor 1302 to assign a value to define time Tap. Time-setting device 130 can be configured to include an input device for receiving an input defining time Tap, which then may be used to be included in an instruction, for example, by processor 1302. In some examples, a memory (not shown) of time-setting device 130 may store time Tap and processor 1302 can be configured to obtain time Tap from the memory. In further examples, time-setting device 130 can be configured to receive time Tap communicated from another device relayed through time-setting device 130. Communication module 1306 can be configured to receive time Tap from an external device or data source, for example, and forward time Tap to processor 1302. Time Tap can be defined as a time value that is later than a current time value obtained from clock 1304 when time Tap is defined. Time Tap can be randomly assigned by the user, for example, to set for camera 110a a starting time to capture images.

In some embodiments, processor 1302 can be configured to define time Tap based on a current time value obtained from clock 1304 when time Tap is defined and a time interval Tat. For example, time Tap can be defined as a time value that is later than a current time value obtained from clock 1304 when time Tap is defined by a difference equal to time interval Tat. Time interval Tat may be calculated by processor 1302, retrieved by processor 1302 from a memory or data source, communicated to processor 1302 from an external device, or inputted by a user to time-setting device 130, or by a combination of the ways thereof. In some examples, time interval Tat is sufficient long to account for one or more operations needed to be performed by or for camera 110a or other cameras between sending of instruction 160a by processor 1302 to camera 110a and the start of camera 110a to capture images at time Tap. For example, the operations may be configuration of other cameras (other than camera 110a, for example) to configure capturing times for starting capturing images at the capturing times. In certain situations, time interval Tat may be randomly assigned by the user.

Processor 1302 can be configured to send instruction 160a to start capturing images at time Tap to camera 110a via communication device 1306. Instruction 160a may indicate or contain a value of time Tap. Instruction 160a may also indicate a recipient of instruction 160a, which would be camera 110a in this case. Communication module 1106a of camera 110a can be configured to receive instruction 160a and forward instruction 160a to processor 1102a of camera 110a. Processor 1102a can be configured to process instruction 160a and direct capturing module 1108a to start capturing images at time Tap according to instruction 160a. Thus, capturing module 1108a can be configured to start capturing images at time Tap as instructed by time-setting device 130 in instruction 160a.

In some embodiments, processor 1102a can be configured to send notification 162a to time-setting device 130 to inform whether capturing module 1108a has successfully started capturing images at time Tap. Notification 162a may indicate or contain a value of time Tap for verification at time-setting device 130. Notification 162a can be sent by processor 1102a via communication module 1106a and received by communication module 1306, which can then forward notification 162a to processor 1302 of time-setting device 130. Processor 1302 can be configured to send another instruction to start capturing images to camera 110a if it determines that notification 162a indicates that camera 110a has not successfully started capturing images at time Tap. Alternatively, processor 1302 can be configured to issue a notice or warning of the failure to start capturing images at time Tap to the user, for example, when processor 1302 determines that camera 110a has not successfully started capturing images at time Tap based on notification 162a.

In some embodiments, processor 1302 of time-setting device 130 can be configured to define time Tbp. As an example, time-setting device 130 can be configured to include an input device (not shown) such as a keypad or touchscreen configured to receive an input causing processor 1302 to assign a value to define time Tbp. Time-setting device 130 can be configured to include an input device for receiving an input defining time Tbp, which then may be used to be included in an instruction, for example, by processor 1302. In some examples, a memory (not shown) of time-setting device 130 may store time Tbp and processor 1302 can be configured to obtain time Tbp from the memory. In further examples, time-setting device 130 can be configured to receive time Tbp communicated from another device relayed through time-setting device 130. Communication module 1306 can be configured to receive time Tbp from an external device or data source, for example, and forward time Tbp to processor 1302. Time Tbp can be defined as a time value that is later than a current time value obtained from clock 1304 when time Tbp is defined. Time Tbp can be randomly assigned by the user, for example, to set for camera 110b a starting time to capture images.

In some embodiments, processor 1302 can be configured to define time Tbp based on a current time value obtained from clock 1304 when time Tbp is defined and a time interval Tbt. For example, time Tbp can be defined as a time value that is later than a current time value obtained from clock 1304 when time Tbp is defined by a difference equal to time interval Tbt. Time interval Tbt may be calculated by processor 1302, retrieved by processor 1302 from a memory or data source, communicated to processor 1302 from an external device, or inputted by a user to time-setting device 130, or by a combination thereof. In some examples, time interval Tbt is sufficient long to account for one or more operations needed to be performed by or for camera 110b or other cameras between sending of instruction 160b by processor 1302 to camera 110b and the start of camera 110b to capture images at time Tbp. For example, the one or more operations may be configuration of other cameras (other than camera 110b, for example) to configure capturing times for starting capturing images at the capturing times. In certain situations, time interval Tbt may be randomly assigned by the user.

Processor 1302 can be configured to send instruction 160b to start capturing images at time Tbp to camera 110b via communication device 1306. Instruction 160b may indicate or contain a value of time Tbp. Instruction 160b may also indicate a recipient of instruction 160b, which would be camera 110b in this case. Communication module 1106b of camera 110b can be configured to receive instruction 160b and forward instruction 160b to processor 1102b of camera 110b. Processor 1102b can be configured to process instruction 160b and direct capturing module 1108b to start capturing images at time Tbp according to instruction 160b. Thus, capturing module 1108b can be configured to start capturing images at time Tbp as instructed by time-setting device 130 in instruction 160b.

In some embodiments, processor 1102b can be configured to send notification 162b to time-setting device 130 to inform whether capturing module 1108b has successfully started capturing images at time Tbp. Notification 162b may indicate or contain a value of time Tbp for verification at time-setting device 130. Notification 162b can be sent by processor 1102b via communication module 1106b and received by communication module 1306, which can then forward notification 162b to processor 1302 of time-setting device 130. Processor 1302 can be configured to send another instruction to start capturing images to camera 110b if it determines that notification 162b indicates that camera 110b has not successfully started capturing images at time Tbp. Alternatively, processor 1302 can be configured to issue a notice or warning of the failure to start capturing images at time Tbp to the user, for example, when processor 1302 determines that camera 110b has not successfully started capturing images at time Tap based on notification 162b.

In some embodiments, time-setting device 130 can be configured to define time Tap and time Tbp such that time Tap indicates the same time value as time Tbp. For example, time interval Tat can be defined or determined to be the same length of time as time interval Tbt. Thus, cameras 110a and 110b can be configured to start capturing images at the same time (Tap or Tbp) when cameras 110a and 110b are synchronized with time-setting device 130. Namely, according to the embodiments herein, the clocks of cameras 110a and 110b can be configured to be synchronized with clock 1304 of time-setting device 130 before cameras 110a and 110b starts capturing images at the same time (Tap or Tbp) as instructed by time-setting device 130.

In some embodiments, time-setting device 130 can be configured to configure cameras 110a and 110b to run on the same time as time-setting device 130 and instruct cameras 110a and 110b to start capturing images at the same capturing time by sending a single instruction to each of cameras 110a and 110b. The instruction may indicate or contain a current time value of time-setting device 130 when the instruction is sent, and a capturing time at which the camera receiving the instruction is to start capturing images. The camera receiving the instruction can be configured to send a notification to time-setting device 130 to inform whether the time of the camera has been successfully configured to the current time value indicated by time-setting device 130 and/or whether the camera receiving the instruction has successfully started capturing images at the capturing time. In response, time-setting device 130 can be configured to send another instruction to configure the time run on the camera and/or the capturing time of the camera.

In some embodiments, a time-setting device is provided being capable of setting times on a plurality of cameras to a time of the time-setting device and defining a capturing time for each of the cameras before any or all of the plurality of cameras can be provided. For example, the time-setting device is capable of being configured to set times and/or define capture times according to the various embodiments as disclosed herein, before the time-setting device is connected with one or more cameras.

In some embodiments, a plurality of cameras are provided being capable of setting times on the cameras to a time of a time-setting device according to instructions sent from the time-setting device and starting capturing images at a capturing time defined by the time-setting device before the time-setting device can be provided. For example, the cameras are capable of being configured to set their times and/or start capturing images according to the various embodiments as disclosed herein, before the cameras are connected with time-setting device.

Figure 5:
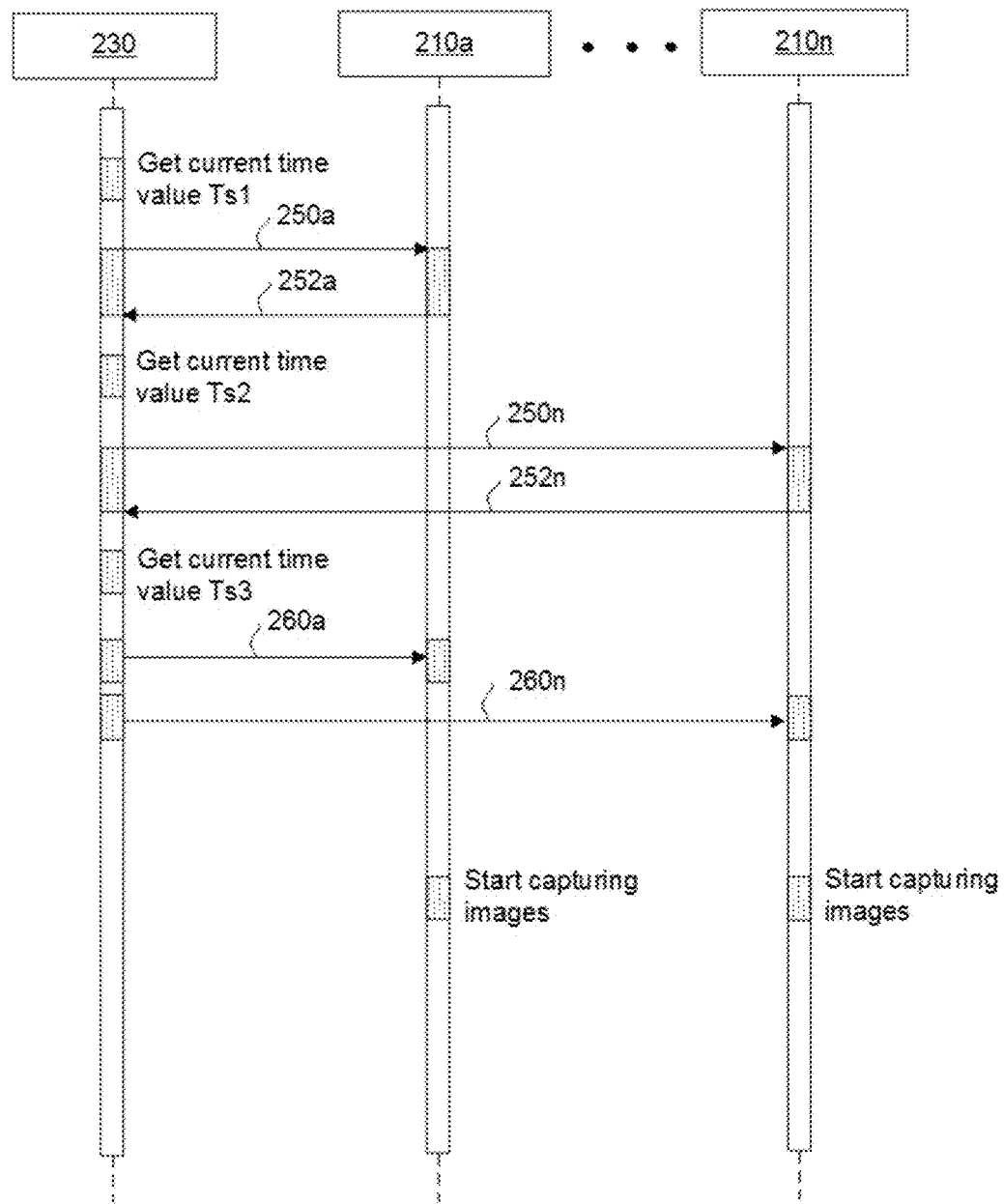
FIG. 5 is a sequence diagram illustrating interactions between a time-setting device and a plurality of cameras consistent with an embodiment of the invention.

FIG. 5 illustrates an exemplary sequence diagram of interactions between a time-setting device and a plurality of cameras according to an embodiment of the invention. The diagram illustrates a time-setting device 230 and a plurality of cameras 210a to 210n, where 210n refers to the Nth camera, N being an integer greater than one. In this example, time-setting device 230 and the plurality of cameras 210a to 210n interact by sending messages. A message as represented herein can serve as an instruction or a notification, depending on the nature of the message. The message may carry a payload, such as a current time value of time-setting device 230 when the message is sent and/or a capturing time value at which a recipient camera of the message starts capturing images, as data for time-setting transferred between time-setting device 230 and the cameras. Time-setting device 230 has a system time Ts running on it, where Ts is a variable. System time Ts may be clocked by a clock of time-setting device 230. Cameras 210a to 210n have clocks running on their own times before being configured by time-setting device 230. The clocks of cameras 210a to 210n may not be running on the same time before being configured by time-setting device 230.

The interactions between time-setting device 230 and the plurality of cameras 210a to 210n will be described in the chronological order shown in FIG. 5. First, time-setting device 230 obtains (or "gets") a current time value Ts1 from system time Ts, and sends a message 250a to camera 210a to synchronize camera 210a using current time value Ts1. Message 250a carries a payload of current time value Ts1 and contains an instruction to camera 210a to set time of camera 210a to current time value Ts1. Camera 210a sets its time to current time value Ts1 in response to receiving message 250a, and sends a message 252a to time-setting device 230 to inform synchronization of camera 210a with time-setting device 230.

Next, time-setting device 230 obtains a current time value Ts2 from system time Ts, and sends a message 250n to camera 210n to synchronize camera 210n using current time value Ts2. Message 250n carries a payload of current time value Ts2 and contains an instruction to camera 210n to set time of camera 210n to current time value Ts2. Camera 210n sets its time to current time value Ts2 in response to receiving message 250n, and sends a message 252n to time-setting device 230 to inform synchronization of camera 210n with time-setting device 230.

After cameras 210a to 210n are synchronized with time-setting device 230, time-setting device 230 obtains a current time value Ts3 from system time Ts, and sends a message 260a to camera 210a to set a capturing time value (Ts3+d) for camera 210a and a message 260n to camera 210n to set the same capturing time value (Ts3+d), where d represents a time interval, and is a constant. Message 260a carries a payload of capturing time value (Ts3+d) and contains an instruction to camera 210a to start capturing images at the capturing time having the value (Ts3+d), and message 260n carries a payload of capturing time value (Ts3+d) and contains an instruction to camera 210n to start capturing images at the capturing time having the value (Ts3+d). Camera 210a configures itself for starting capturing images at capturing time having the value (Ts3+d) in response to receiving message 260a, and camera 210n configures itself for starting capturing images at capturing time having the value (Ts3+d) in response to receiving message 260n.

After cameras 210a to 210n are configured to start capturing images at capturing time (Ts3+d), time Ts progresses until time Ts matches (Ts3+d) and cameras 210a to 210n start capturing images.

Figure 6:
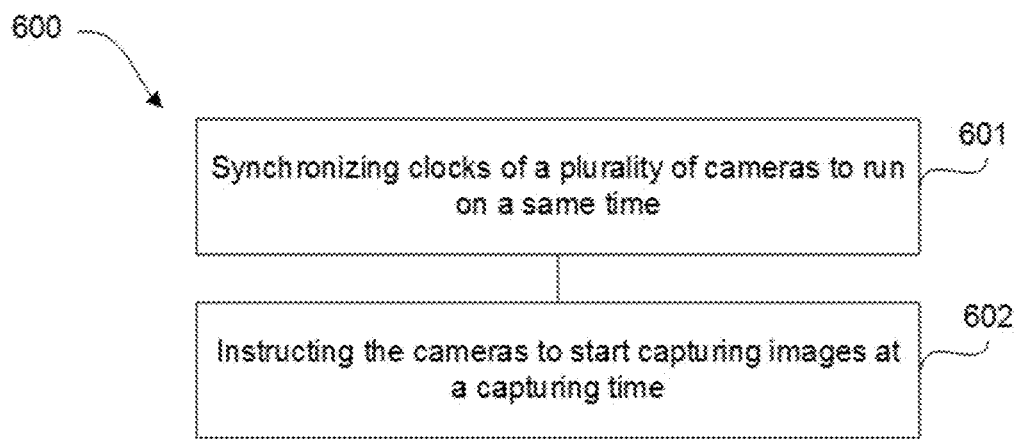
FIG. 6 is a flowchart of a method of configuring a plurality of cameras to capture images, consistent with an embodiment of the invention.

Embodiments of the invention will be described referring to steps of methods illustrated in FIGS. 6-10. FIG. 6 shows a method 600 of configuring a plurality of cameras to capture images according to an embodiment of the invention. In step 601, clocks of a plurality of cameras are synchronized to run on a same time. As described above, the clocks of the cameras can be synchronized to run on a same time as a time-setting device. Each camera can be synchronized independently with the time-setting device, and synchronized cameras will run on the same time as the time-setting device.

For example, the plurality of cameras includes a first camera and a second camera. A time of the first camera, e.g., a time according to which the first camera operates, can be set to a first current time value of a source of time. A time of the second camera, e.g., a time according to which the second camera operates, can be set to a second current time value of the same source of time. The source of time may be external to the cameras, and current time values of the source of time may be communicated to the cameras, respectively. For example, the source of time may include a clock provided in the time-setting device. The first current time value may be different from the second current time value because, for example, they are obtained at different times of the source of time. The first current time value can be communicated to the first camera, and the second current time value can be communicated to the second camera. The first and second cameras can then use the first and second current time values, respectively, to set time.

In Step 602, the cameras are instructed to start capturing images at a capturing time. As described above, a capturing time at which a camera starts capturing images can be obtained by the time-setting device, and the cameras are instructed by the time-setting device to start capturing images at the capturing time. An occurrence of the capturing time can trigger the cameras to start capturing images. If the same capturing time is provided to all cameras, all cameras can start capturing images at the same time.

In another example, a capturing time can be obtained based on a source of time external to a first and a second camera. The capturing time can be communicated to the first and second cameras. The first and second cameras can be caused to start capturing images at the capturing time, for example, by sending instructions to the cameras to start capturing images at the capturing time. The capturing time can be communicated to the first and second cameras with the instructions.

In some embodiments, step 601 can be performed after step 602. Namely, synchronizing clocks of a plurality of cameras to run on a same time is performed after instructing the cameras to start capturing images at a capturing time. As described above, the performance of the steps in this order will require attention to make sure that a value of the capturing time is later than the current time value of the camera(s) right after synchronization.

Figure 7:
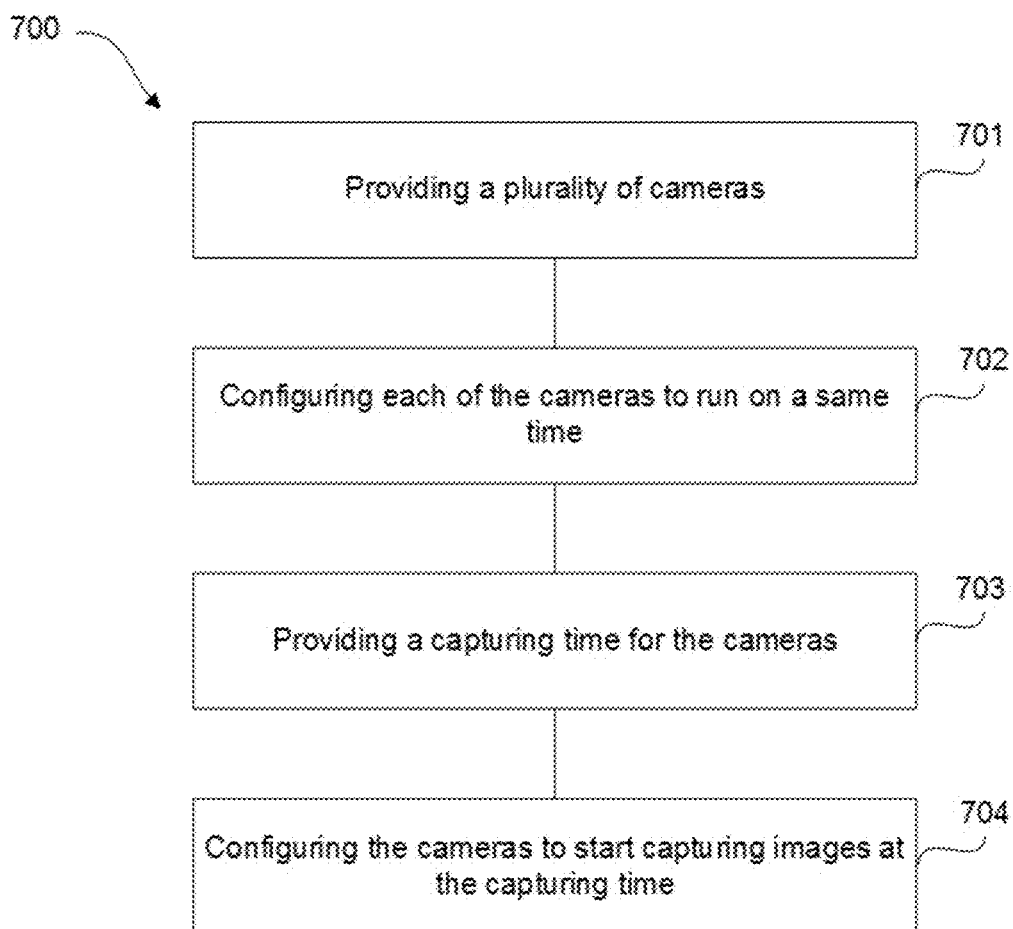
FIG. 7 is a flowchart of a method of causing a plurality of cameras to start capturing images, consistent with an embodiment of the invention.

FIG. 7 shows a method 700 of causing a plurality of cameras to start capturing images according to an embodiment of the invention. In step 701, a plurality of cameras is provided. The cameras may be set up to be connected to a network, for example. In step 702, each of the cameras is configured to run on a same time. As described above, each of the cameras has a clock, which can be set to a time run on a time-setting device. For example, the time-setting device can provide a current time value of the time-setting device to each camera and instruct the camera to set its time to the current time value provided.

In step 703, a capturing time is provided for the cameras. A capturing time can be a specific time at which the cameras start capturing images. A value of the capturing time can be defined or otherwise obtained by a time-setting device, and communicated to the cameras. For example, the capturing time may be calculated by the time-setting device, retrieved by the time-setting device from a memory or data source, communicated to the time-setting device from an external device, or inputted by a user to the time-setting device, or by a combination thereof. The capturing time can be defined as a time value later than a current time value of the time-setting device when the capturing time is defined.

In step 704, the cameras are configured to start capturing images at the capturing time. For example, the cameras can configure themselves based on the capturing time to start capturing images at the capturing time. The cameras can also be configured by the time-setting device that sets the capturing time in step 703. For example, the time-setting device can instruct each of the cameras to start capturing images at the capturing time.

Figure 8:
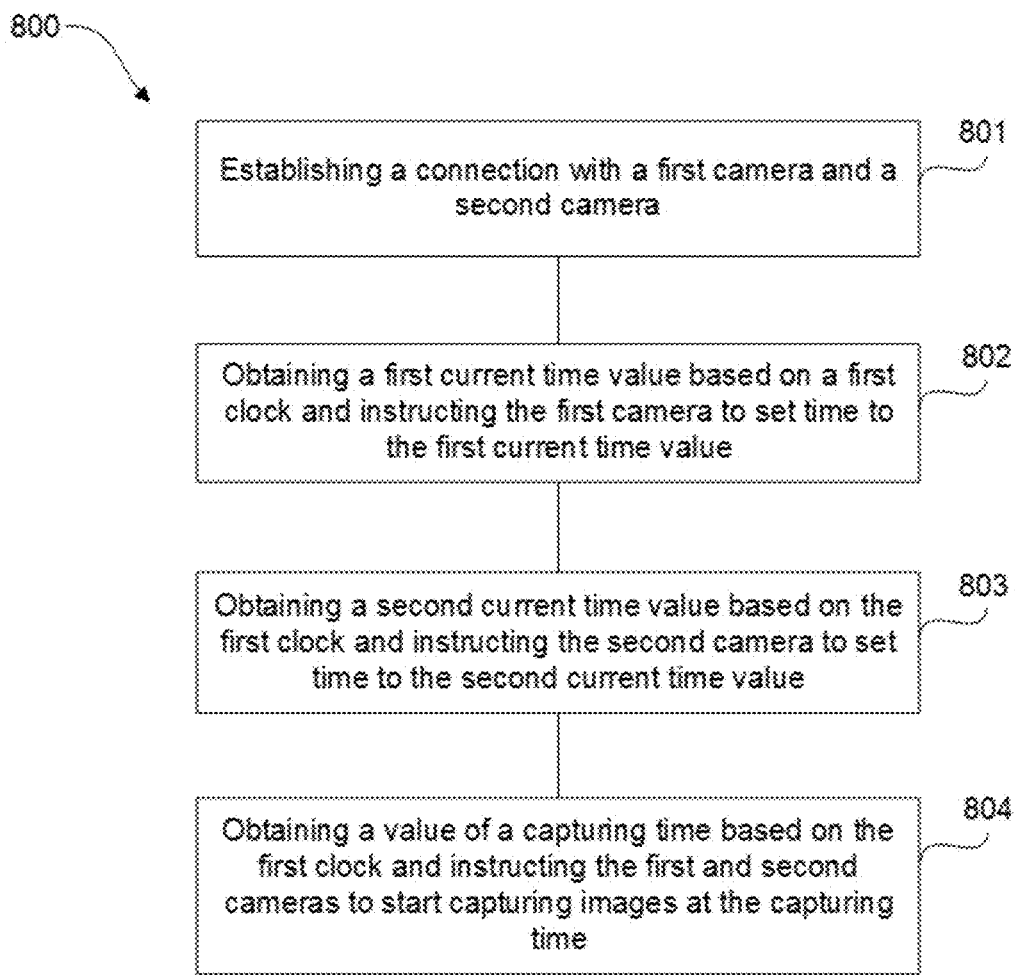
FIG. 8 is a flowchart of a method of configuring a plurality of cameras to start capturing images, consistent with an embodiment of the invention.

FIG. 8 shows a method 800 of configuring a plurality of cameras to start capturing images according to an embodiment of the invention. In step 801, a connection is established with a first camera and a second camera. The connection can be established over a wired or wireless network, such as a WiFi network. A time-setting device can be configured to establish the connection with the cameras.

In step 802, a first current time value based on a first clock is obtained, and the first camera is instructed to set time to the first current time value. The first clock can include a clock of a time-setting device in connection with the first and second cameras. The time-setting device can obtain the first current time value from the first clock, and instruct the first camera to set time to the first current time value. The first camera can set a clock of the first camera to the first current time value when instructed, for example, by the time-setting device.

In step 803, a second current time value based on the first clock is obtained, and the second camera is instructed to set time to the second current time value. The time-setting device can obtain the second current time value from the first clock, and instruct the second camera to set time to the second current time value. The second camera can set a clock of the second camera to the second current time value when instructed, for example, by the time-setting device.

An additional step may be included after a particular camera, e.g., the first or second camera, is instructed to set time according to the instruction to set time to the current time value based on the first clock. For example, it can be verified whether the first camera has successfully set time to the first current time value according to the instruction to set time to the first current time value. The verification can be conducted based on a notification sent from the first camera informing whether the first camera has successfully set time to the first current time value. If the verification indicates that the first camera has not successfully set time to the first current time value, a third current time value can be obtained based on the first clock, and the first camera can be instructed to set time to the third current time value. A similar verification can be performed with respect to the second cameras, and a fourth current time value based on the first clock can be obtained and the second camera can be instructed to set time to the fourth current time value if a verification indicates that the second camera has not successfully set time to the second current time value.

In step 804, a capturing time is obtained based on the first clock, and the first and second cameras are instructed to start capturing images at the capturing time. The time-setting device can obtain the capturing current time based on the first clock. For example, the capturing time may be obtained by defining, calculating, or receiving by the time-setting device. For example, the capturing time can be a specific time value based on the first clock inputted by a user. The capturing time can be obtained based on a current time value of the first clock as a specific time for the first and second cameras to start capturing images. The capturing time can be a time value later than a current time value of the first clock when the capturing time is obtained, and also later than the first and second current time values. The capturing time can be later than a current time value when the capturing time is obtained, the first current time value, or the second current time value. The capturing time can be obtained as a sum of a current time value obtained from the first clock and a time interval, the current time value being different from the first and second current time values obtained for setting time of the first and second cameras. The interval can be defined, calculated, or received by the time-setting device.

An additional step can be performed to verify whether a specific time value inputted by a user, for example, to be used as the capturing time allows sufficient time to instruct the first and second cameras to start capturing images at the inputted capturing time. For example, it is ensured that there will be time both for the first and second cameras to be instructed to start capturing images at the inputted capturing time and for first and second cameras to actually start capturing images at the inputted capturing time. If it is verified that there will not be enough time for the first and second cameras to start capturing images at the inputted capturing time, the user can be prompted to input another specific time value, for example.

In some examples, a user may want the cameras to start capturing images "now" or "immediately." A capturing time may include an option for the user to indicate an immediate start of the cameras to capture images. A capturing time can be calculated, defined, or otherwise obtained for the first and second cameras to be instructed to start capturing images before the first and second cameras can actually start capturing images, when a user indicates that he or she would like the image-capturing to start now or immediately. In the case of using a time-setting device in the method, for example, a processor of the time-setting device can be configured to calculate a capturing time in response to an indication that the cameras are to immediately start capturing images. The processor can then instruct the capturing time to the first and second cameras to start capturing images at the capturing time.

A capturing time may include an adjusted time value as defined or calculated to allow the cameras to start capturing images immediately after a specific time value is inputted by the user as a capturing time. For example, a specific time value inputted by a user who desires an immediate start of the cameras to capture images may be adjusted, when necessary, to result in an adjusted value to ensure that there is time for the first and second cameras to be instructed to start capturing images before the first and second cameras can actually start capturing images.

Figure 9:
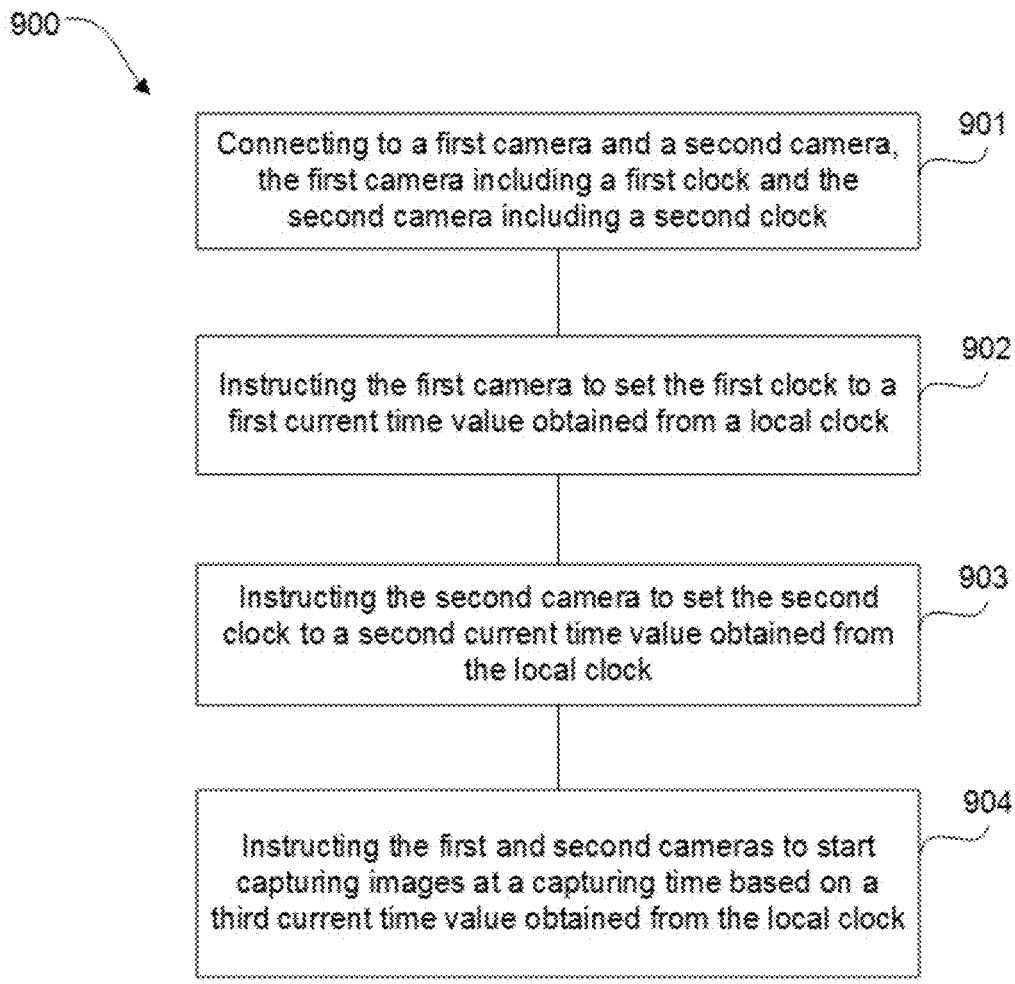
FIG. 9 is a flowchart of a method of configuring a plurality of cameras consistent with an embodiment of the invention.

FIG. 9 shows a method 900 of configuring a plurality of cameras according to an embodiment of the invention. In step 901, a first camera and a second camera may be connected over a network, for example, for the purpose of performing method 900. The connection may be established by a time-setting device with the first and second cameras. The connection can be any type known to a person of skill in the art enabling the time-setting device to communicate with the first and second cameras. The first camera has a first clock, and the second camera has a second clock. The first clock and the second clock are each capable of being adjusted to, for example, run on a different time.

In step 902, the time-setting device instructs the first camera to set the first clock to a first current time value obtained from a local clock. The local clock can include a clock local to a device external to the first and second cameras, such as a time-setting device. The local clock can indicate a time, such as a system time, of the time-setting device. The time-setting device can obtain a first current time value of the local clock, which is current with respect to the time-setting device based on the time running on the local clock, and use it to instruct the first camera to set the first clock to the first current time value. The instruction to the first camera to set the first clock to the first current time value can include instructing the first camera to set time to the first current time value, after which the first camera can process the instruction and set the first clock to the first current time value. The first clock can subsequently run on a time synchronized with the local clock of the time-setting device.

In step 903, the time-setting device instructs the second camera to set the second clock to a second current time value obtained from the local clock. If step 902 is performed using a local clock of a time-setting device, the time-setting device can obtain a second current time value of the local clock, which is current with respect to the time-setting device based on the time running on the local clock, and use it to instruct the second camera to set the second clock to the second current time value. The instruction to the second camera to set the second clock to the second current time value can include instructing the second camera to set time to the second current time value, after which the second camera can process the instruction and set the second clock to the second current time value. The second clock can subsequently run on a time synchronized with the local clock of the time-setting device.

In step 904, the first and second cameras are instructed, such as by a time-setting device, to start capturing images at a capturing time based on a third current time value obtained from the local clock. The time-setting device can obtain the capturing time by defining, calculating, or receiving a specific time value for the first and second cameras to start capturing images based on the local clock of the time-setting device. The capturing time can be a sum of a current time value obtained from the local clock when the capturing time is obtained and a time interval. The capturing time can be obtained as a specific time value later than a current time value of the local clock when the capturing time is obtained. The time-setting device can instruct the first and second cameras to start capture images at the capturing time. There may be separate instructions to start capturing images for each of the first and second cameras. Namely, the time-setting device can send an instruction to the first camera to start capturing images at the capturing time and send another instruction to the second camera to start capture images at the capturing time. Such an instruction may be sent as a message or as part of a message.

In some examples, method 900 can further include receiving a first notification from the first camera after instructing the first camera to set the first clock to the first current time value. The first notification can include a first indication whether the first camera has successfully set the first clock to the first current time value. Similarly, method 900 can include receiving a second notification from the second camera after instructing the second camera to set the second clock to the second current time value. The second notification can include a second indication whether the second camera has successfully set the second clock to the second current time value. Additional steps can be included to instruct the first/second camera to set time again according to the time of the local clock if the camera notifies that the setting time to the first/second current time value has not been successful. For example, the first camera can be instructed to set the first clock to a fourth time value obtained from the local clock in response to receiving the first notification, and the second camera can be instructed to set the second clock to a fifth time value obtained from the local clock in response to receiving the second notification. In some examples, method 900 can include receiving a notification from any one of the cameras whether the camera sending the notification has successfully set time based on the local clock. If the notification indicates that the camera sending the notification has not successfully set time based on the local clock, an instruction can be sent to that camera sending the notification to set time again based on the local clock.

In some examples, the first current time value, the second current time value, and the third current time value can be different, because they are obtained from the local clock at different times. In some examples, the fourth current time value and the fifth current time value can be different because they are obtained from the local clock at different times.

Alternatively, in some examples, the first and second cameras can be instructed to start capturing images at different capturing times based on the local clock. The different capturing times can be obtained based on current time values obtained from the local clock at different times. The different capturing times can alternatively contain different time intervals but a same current time value obtained from the local clock such that different time intervals added to the same current time value result in different capturing times. For example, alternative to step 904, method 900 can include instructing the first camera to start capturing images at a first capturing time based on the local clock and instructing the second camera to start capturing images at a second capturing time based on the local clock. The first capturing time can indicate a different time from the second capturing time. In this case, the first camera and the second camera will start capturing images at different times.

Figure 10:
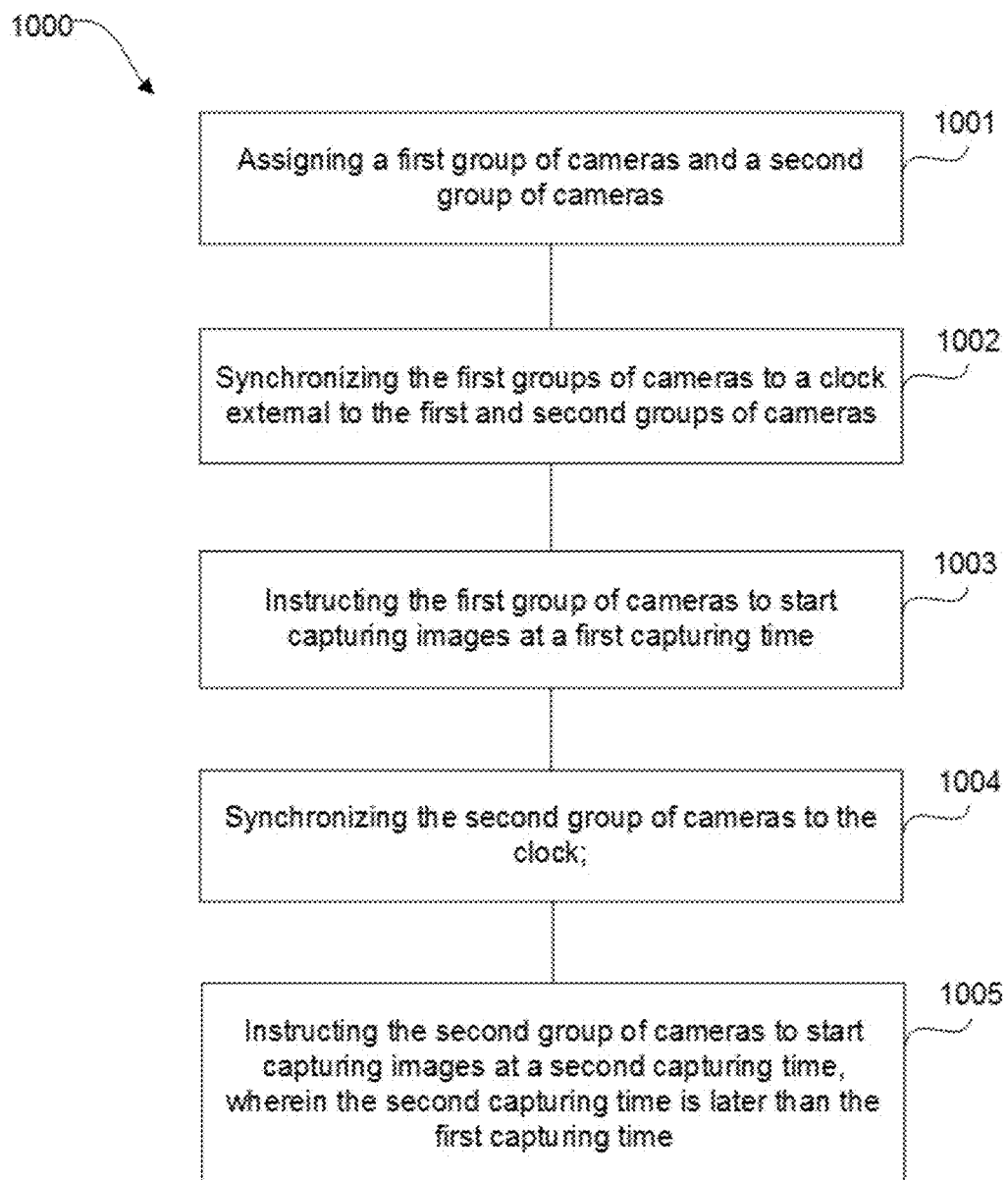
FIG. 10 is a flowchart of a method of configuring multiple groups of cameras consistent with an embodiment of the invention.

FIG. 10 shows a method 1000 of configuring multiple groups of cameras according to an embodiment of the invention. In step 1001, a first group of cameras and a second group of cameras are assigned. The cameras can be assigned to different groups by a user or according to some instructions from a device, such as a time-setting device. The cameras can be assigned to different groups at different times or depending on the conditions of the operation. For example, the first group of cameras may be assigned and start operating, e.g., capturing images, as a group, before the second group of cameras is assigned. In some examples, cameras can be reassigned, for example, to a different group.

In step 1002, the first group of cameras is synchronized to a clock external to the first and second groups of cameras. The clock may be included in a device configured to set time to the cameras, such as a time-setting device. A camera in the first group can be configured to include a group identifier indicating that it belongs to the first group of cameras. Instructions to synchronize the cameras in the first group can be sent with a group identification. For example, an instruction sent to synchronize a particular camera in the first group can identify the camera with the first group. A plurality of current times can be separately obtained, e.g., at different times, from the external clock, and a plurality of instructions can be separately sent to the cameras in the first group to set time of the cameras in the group to the obtained current times, respectively. Steps and configurations relating to the synchronization in this manner can be performed similarly to the embodiments described above.

In step 1003, the first group of cameras is instructed to start capturing images at a first capturing time. A first capturing time value can be obtained similarly to the embodiments described above. A plurality of instructions can be separately sent to the cameras in the first group to start the cameras in the group to capture images at the first capture time.

In step 1004, the second group of cameras is synchronized to the same clock external to the first and second groups of cameras. A camera in the second group can be configured to include a group identifier indicating that it belongs to the second group of cameras. Instructions to synchronize the cameras in the second group can be sent with a group identification. For example, an instruction sent to synchronize a particular camera in the second group can identify the camera with the second group. A plurality of current times can be separately obtained, e.g., at different times, from the external clock, and a plurality of instructions can be separately sent to the cameras in the second group to set time of the cameras in the group to the obtained current times, respectively. Steps and configurations relating to the synchronization in this manner can be performed similarly to the embodiments described above.

In step 1005, the second group of cameras is instructed to start capturing images at a second capturing time. A second capturing time value can be obtained similarly to the embodiments described above. A plurality of instructions can be separately sent to the cameras in the second group to start the cameras in the group to capture images at the second capture time. The second capturing time can indicate a same time value as the first capturing time. Alternatively, the second capturing time can indicate a different time value from the first capturing time. If the second capturing time indicates a different time value from the first capturing time, for example, the second capturing time being later than the first capturing time, the first and second groups of cameras will start capturing images at different times.

It is understood that additional and/or detailed steps embodying the other features described in the disclosure herein can be applicable to or incorporated in any of the methods above as appropriate.

In some embodiments, any or all of the steps, methods, and/or other functions as disclosed herein can be stored as instructions on a computer readable medium such as a non-transitory computer readable storage medium. The computer readable medium may be included in a time-setting device described in the embodiments above, and the instructions can be executed by the time-setting device to cause the time-setting device to perform operations including the above steps, methods, and/or functions. For example, a time-setting device according to the embodiments can be configured to include a processor configured to perform the above steps, methods, and/or functions.

In some embodiments, any or all of the steps, methods, and/or other functions as disclosed herein can be included in a computer-implemented method. In some embodiments, any or all of the steps, methods, and/or other functions as disclosed herein can be performed by a computing device including a clock, a processor, a communication module, and a storage, such as a server, workstation, portable computer, handheld computer, tablet computer, smartphone, and smartwatch. For example, the computing device can be configured to establish communication with a plurality of cameras via the communication module. The computing device can be configured to send instructions to the cameras via the communication module. The computing device can be configured to obtain a plurality of current times values of the clock and instruct a plurality of cameras to set time to the obtained current time values, respectively, by the processor.

The processor can be configured to define a capturing time based on the clock and instruct the cameras to start capturing images at the capturing time. The computing device can be configured to execute instructions stored on the storage to cause operations of the obtaining the current time values, defining the capturing time, and sending instructions to the cameras to set time and start capturing images at the capturing time. The computing device can be configured to perform other steps or functions as described above in the various embodiments.

A time-setting device may include an electronic device configured to implement the above methods and functions. The electronic device can include a hardware clock and/or a software clock, which can be configured to set time as described in the embodiments herein. For example, a system time or a time of a local clock as described above may not necessarily be implemented by only one type of the clocks. As it is understood by a person of skill in the art, the electronic device may be configured to keep time by using a combination of a hardware clock and a software clock in order to implement an embodiment herein.

In some embodiments, a communication module described herein can include a wireless module such as a cellular, infrared, optical, Bluetooth, WiFi, or satellite module, or a combination thereof. Alternately or additionally, the communication module can include a wired module such as an interface or port for a twisted pair, coaxial, or optical wire, or an electric conductor, or a combination thereof. In some embodiments, a network described herein can include a private or proprietary network or a third part network. Alternately or additionally, the network can include a public network, such as the Internet.

As described herein, cameras may include devices capable of capturing images including still images, moving images, holographic images, virtual reality images, other types of images, or a combination thereof. In some embodiments, cameras can be configured to capture images for generating a composed view, a panoramic view, a virtual reality, or a hologram, for example. In some embodiments, cameras are provided in a rig. For example, cameras can be configured according to the embodiments via the rig. In some embodiments, a rig can be configured to include a clock, and a plurality of cameras set up on the rig can be configured to operate on the clock of the rig, instead of operating on their own clocks. In this case, the rig can be configured to be instructed to set time of its clock. An instruction to start capturing images at the capturing time can be sent via the rig to the cameras. Alternatively, the rig may be configured to send an instruction to the cameras to start capturing images at a capturing time when the rig obtains the capturing time. In some embodiments, additional cameras may be added according to a user requirement such that a method according to an embodiment above can be implemented flexibly whenever additional cameras are added.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for capturing an image, comprising:
   first and second cameras for capturing images; and
   a time-setting device having a first clock, the time-setting device being configured to synchronize the first camera and the second camera with the first clock by sending a first current time value of the first clock to the first camera and a second current time value of the first clock to the second camera and sending a capturing time value to the first and second cameras to start capturing images at the capturing time,
   wherein the first and second cameras are configured to start capturing images at the capturing time, and
   wherein the first current time value is different from the second current time value,
   wherein the first and second cameras are configured to send a notification to the time-setting device indicating whether the first and second cameras are synchronized with the first clock, and the time-setting device is configured to send an instruction to set a newly first current time value of the first clock to the first camera and a newly second current time value of the first clock to the second camera if the notification indicates that the first and second cameras are not synchronized with the first clock.

2. The system of claim 1, wherein the time-setting device is configured to obtain the first current time value, the second current time value, and the capturing time value based on the first clock.

3. The system of claim 1, wherein:
   the first camera comprises a second clock configured to use the first current time value to synchronize with the first clock; and
   the second camera comprises a third clock configured to use the second current time value to synchronize with the first clock.

4. The system of claim 2, wherein the time-setting device is configured to send an instruction to the first and second cameras to start capturing images at the capturing time.

5. The system of claim 3, wherein the time-setting device is configured to obtain the first current time value and the second current time value from the first clock at different times.

6. A time-setting device for configuring a plurality of cameras to capture images, comprising:
   a clock configured to run on a time;
   a memory storing instructions; and
   a processor configured to execute the instructions to:
     communicate with a first camera and a second camera of the plurality of cameras;
     obtain a first current time value from the clock and instruct the first camera to set a first camera time to the first current time value;
     obtain a second current time value from the clock and instruct the second camera to set a second camera time to the second current time value;
     wherein the first current time value is different from the second current time value;
     obtain a value of a capturing time based on a third current time value obtained from the clock; and
     instruct the first and second cameras to start capturing images at the capturing time;

wherein the first and second cameras are configured to send a notification to the time-setting device indicating whether the first and second cameras are synchronized with the clock, and the time-setting device is configured to send an instruction to set a newly first current time value of the clock to the first camera and a newly second current time value of the clock to the second camera if the notification indicates that the first and second cameras are not synchronized with the clock.

7. The time-setting device of claim 6, further comprising a communication module configured to:
 forward a first instruction from the processor to the first camera to set the first camera time to the first current time value;
 forward a second instruction from the processor to the second camera to set the second camera time to the second current time value;
 forward a third instruction from the processor to the first camera to start capturing images at the capturing time; and
 forward a fourth instruction from the processor to the second camera to start capturing images at the capturing time.

8. A system for capturing images, comprising:
 a first camera having a first processor, a first clock, and a first capturing module; and
 a second camera having a second processor, a second clock, and a second capturing module,
 a time-setting device having a third processor and a third clock,
 wherein the first processor is configured to:
  receive a first current time value from the third clock;
  set the first clock to the first current time value to synchronize the first clock with the third clock;
  receive a value of a capturing time obtained based on the third clock; and
  instruct the first capturing module to start capturing images at the capturing time, and
 wherein the second processor is configured to:
  receive a second current time value obtained from the third clock;
   wherein the second current time value is different from the first current time value;
  set the second clock to the second current time value to synchronize the second clock with the third clock;
  receive the value of the capturing time obtained based on the third clock; and
  instruct the second capturing module to start capturing images at the capturing time,
 wherein the first processor is configured to send a notification to the time-setting device indicating whether the first camera is synchronized with the third clock, and the third processor is configured to send an instruction to set a newly first current time value of the third clock to the first camera;
 wherein the second processor is configured to send a notification to the time-setting device indicating whether the second camera is synchronized with the third clock, and the third processor is configured to send an instruction to set a newly second current time value of the third clock to the second camera.

9. A method of configuring a plurality of cameras to capture images, comprising:
 synchronizing clocks of the plurality of cameras to run on a same time including:
  setting a time of a first camera of the plurality of cameras to a first current time value;
  setting a time of a second camera of the plurality of cameras to a second current time value different from the first current time value, wherein the first and second current time values are obtained from a clock of a time-setting device and communicated to the first and second cameras, respectively; and
 instructing the plurality of cameras to start capturing images at a capturing time;
 wherein the first and second cameras are configured to send a notification to the time-setting device indicating whether the first and second cameras are synchronized with the clock, and the time-setting device is configured to send an instruction to set a newly first current time value of the clock to the first camera and a newly second current time value of the clock to the second camera if the notification indicates that the first and second cameras are not synchronized with the clock.

10. The method of claim 9, wherein instructing the plurality of cameras to start capturing images at a capturing time comprises:
 obtaining the capturing time based on a source of time external to the first and second cameras; and
 causing the first and second cameras to start capturing images at the capturing time.

11. A method of causing a plurality of cameras to capture images, comprising:
 providing a plurality of cameras;
 configuring each of the plurality of cameras to run on a same time;
 setting a time of each of the plurality of cameras to a current time value of a time-setting device;
  wherein the current time value is different for each of the plurality of cameras;
 providing a capturing time for the plurality of cameras; and
 configuring the plurality of cameras to start capturing images at the capturing time,
 wherein the plurality of cameras are configured to send a notification to the time-setting device indicating whether the plurality of cameras are synchronized with the time-setting device, and the time-setting device is configured to send an instruction to set a newly current time value of the time-setting device to the plurality of cameras if the notification indicates that the plurality of cameras are not synchronized with the time-setting device.

12. The method of claim 11, wherein providing a capturing time for the plurality of cameras comprises:
 obtaining a value of the capturing time by the time-setting device; and
 communicating the value of the capturing time to each of the plurality of cameras by the time-setting device.

13. The method of claim 11, wherein configuring the plurality of cameras to start capturing images at the capturing time comprises:
 instructing each of the plurality of cameras to start capturing images at the capturing time.

14. A method of configuring a plurality of cameras to start capturing images, comprising:
 establishing a connection with a first camera and a second camera of the plurality of cameras;
 obtaining a first current time value based on a clock and instructing the first camera to set time to the first current time value;

obtaining a second current time value based on the clock and instructing the second camera to set time to the second current time value;
- wherein the first current time value is different from the second current time value; and obtaining a value of a capturing time based on the clock and instructing the first and second cameras to start capturing images at the capturing time, the connection with the first camera and the second camera is established by a time-setting device, and wherein the clock is included in the time-setting device, wherein the first and second cameras are configured to send a notification to the time-setting device indicating whether the first and second cameras are synchronized with the clock, and the time-setting device is configured to send an instruction to set a newly first current time value of the clock to the first camera and a newly second current time value of the clock to the second camera if the notification indicates that the first and second cameras are not synchronized with the clock.

15. The method of claim 14, wherein the value of the capturing time is obtained as a specific time value based on the clock inputted by a user, and wherein the method further comprises:
verifying whether the specific time value inputted by the user allows sufficient time to perform instructing the first and second cameras to start capturing images at the inputted capturing time.

16. The method of claim 14, wherein the value of the capturing time is obtained when a user indicates an immediate start of the first and second cameras to capture images, and wherein the method further comprises:
calculating the value of the capturing time in response to an indication that the first and second cameras are to immediately start capturing images.

17. A method of configuring a plurality of cameras, comprising:
connecting to a first camera and a second camera of the plurality of cameras, the first camera including a first clock and the second camera including a second clock;
instructing the first camera to set the first clock to a first current time value obtained from a local clock of a time-setting device;
instructing the second camera to set the second clock to a second current time value obtained from the local clock;
- wherein the first current time value is different from the second current time value; and instructing the first and second cameras to start capturing images at a capturing time based on a third current time value obtained from the local clock;
wherein the first and second cameras are configured to send a notification to the time-setting device indicating whether the first and second cameras are synchronized with the local clock, and the time-setting device is configured to send an instruction to set a newly first current time value of the local clock to the first camera and a newly second current time value of the local clock to the second camera if the notification indicates that the first and second cameras are not synchronized with the local clock.

18. The method of claim 17, wherein the first current time value, the second current time value, and the third current time value are obtained from the local clock at different times.

19. A method of configuring a plurality of cameras, comprising:
connecting to a first camera and a second camera of the plurality of cameras, the first camera including a first clock and the second camera including a second clock;
instructing the first camera to set the first clock to a first current time value obtained from a local clock of a time-setting device;
instructing the second camera to set the second clock to a second current time value obtained from the local clock;
- wherein the first current time value is different from the second current time value;

instructing the first camera to start capturing images at a first capturing time based on the local clock; and
instructing the second camera to start capturing images at a second capturing time based on the local clock,
wherein the first capturing time indicates a different time from the second capturing time;
wherein the first and second cameras are configured to send a notification to the time-setting device indicating whether the first and second cameras are synchronized with the local clock, and the time-setting device is configured to send an instruction to set a newly first current time value of the local clock to the first camera and a newly second current time value of the local clock to the second camera if the notification indicates that the first and second cameras are not synchronized with the local clock.

20. A method of configuring multiple groups of cameras, comprising:
assigning a first group of cameras and a second group of cameras;
synchronizing the first group of cameras to a clock of a time-setting device external to the first and second groups of cameras;
instructing the first group of cameras to start capturing images at a first capturing time;
synchronizing the second group of cameras to the clock; and
instructing the second group of cameras to start capturing images at a second capturing time,
wherein the second capturing time is later than the first capturing time;
wherein synchronizing the first group of cameras to the clock external to the first and second groups of cameras comprises: obtaining a plurality of current times of the first group of cameras at different times from the external clock, and sending a plurality of instructions to the first group of cameras separately to set times of the first group cameras to the obtained plurality of current times respectively; and
wherein synchronizing the second group of cameras to the clock external to the first and second groups of cameras comprises: obtaining a plurality of current times of the second group of cameras at different times from the external clock, and sending a plurality of instructions to the second group of cameras separately to set times of the second group cameras to the obtained plurality of current times respectively;
wherein the first group of cameras and the second group of cameras are configured to send a notification to the time-setting device indicating whether the first group of cameras and the second group of cameras are synchronized with the clock, and the time-setting device is configured to send an instruction to set a newly obtained plurality of current times to the first group of cameras and a newly obtained plurality of current times to the second group of cameras if the notification indicates that the first group of cameras and the second group of cameras are not synchronized with the local clock.

21. A non-transitory computer readable medium with instructions stored thereon, that when executed by a processor, cause the processor to perform steps comprising:

synchronizing clocks of a plurality of cameras to run on a same time, including:
setting a time of a first camera of the plurality of cameras to a first current time value; and
setting a time of a second camera of the plurality of cameras to a second current time value,
wherein the first and second current time values are obtained from a clock of a time-setting device communicated to the first and second cameras, respectively, and the first current time value is different from the second current time value, and;

instructing the plurality of cameras to start capturing images at a capturing time, including:
obtaining the capturing time based on the source of time; and
causing the first and second cameras to start capturing images at the capturing time;
wherein the first and second cameras are configured to send a notification to the time-setting device indicating whether the first and second cameras are synchronized with the clock, and the time-setting device is configured to send an instruction to set a newly first current time value of the clock to the first camera and a newly second current time value of the clock to the second camera if the notification indicates that the first and second cameras are not synchronized with the clock.

* * * * *